Patented Apr. 1, 1952

2,591,368

UNITED STATES PATENT OFFICE 2,591,368

WATER- AND FLAMEPROOFING COMPOSITION

James Francis McCarthy, Mars, Pa., assignor, by mesne assignments, to Treesdale Laboratories and Textile Processing Company, a corporation of Pennsylvania No Drawing. Application January 22, 1947, Serial No. 723,674

1 Claim. (Cl. 260—17)

The present invention relates to compositions for coating and impregnating textiles, fibers or filaments of cellulose, rayon, wool, silk and the like.

The textile industry has, for a long time, been seeking a satisfactory answer to the problem of preventing or at least greatly reducing the physical and chemical deterioration of fabrics, and woven or felted fibers when employed as protective coatings. The problem is, however, complex and a complete solution thereof is still missing. For example, mere moisture-proofing is troublesome. Some waxes, rubbers and resins, which are commonly employed as the base of waterproofing compositions, cause deterioration of the materials to which they are applied. Others do not provide permanent protection, being soluble in cleaning fluids or various detergents. Still other treating materials harden upon ageing, exhibit poor adhesion for the base material, or are dangerously inflammable.

Fireproofing or flame resistance is obtained by the deposition on and in fabrics of relatively incombustible agents or materials which will, upon decomposition induced by heat, release gases incapable of supporting combustion. Inorganic compounds such as borax, tin oxide, ferric oxide, zinc oxide, ammonium sulfate, tin chloride, etc., are examples of the more widely used flameproofing agents. The selected flameproofing material has been made, on occasion, a part of the waterproofing compositions by incorporation therewith, although these combinations have frequently been found to lack the full cumulative characteristics which are to be expected.

A further serious disadvantage of presently employed compositions is the general inclusion therein of a volatile organic solvent in which the primary waxes or other waterproofing agents are dissolved to facilitate application. The presence of such solvent causes fire hazards, necessitates consideration of solvent recovery, raises also the possibility of solvent toxicity. These factors preclude the use of material of this type by many manufacturers who do not possess the necessary equipment.

The principal object of the present invention is to provide a water- and flameproofing composition, employing readily available materials, for textiles and fibrous materials which will avoid the disadvantages of prior compositions.

A further object of my invention is the provision of a simple water- and flameproofing composition which can be handled in standard equipment.

Other objects and advantages of the invention will become apparent from consideration of the following detailed description of certain prepared embodiments thereof.

I have discovered, and the present application is based upon the discovery, that it is possible to form a water dispersion of water- and flameproofing agents which is stable and which will impart to fibrous material treated therewith a high degree of protection.

The primary flameproofing and waterproofing agent of the treating composition of the invention is a chlorine-containing vinyl resin, polyvinyl chloride or polymerized vinylidene chloride. The vinyl resin possesses the property of decomposing at relatively low temperatures of combustion to liberate chlorine which tends to smother the fire causing decomposition. The coating characteristics of the vinyl resins are well known. It is, therefore, sufficient here to point out that coating compositions employing a vinyl resin base can be used to impregnate only fabrics rendering them water repellent or to coat fully fabrics rendering them impervious. Both types of coatings are possible using my compositions.

The vinyl resins are modified to insure proper flexibility by the incorporation therewith of suitable plasticizing agents. It is of course necessary that the plasticizer be compatible with the resin and also that it have a relatively high boiling point to prevent excessive vaporization thereof. Furthermore it is important that the plasticizer be relatively insoluble in the ordinary dry cleaning agents to reduce subsequent loss when treated materials undergo cleaning. Among the plasticizers I have found to be satisfactory are dibutyl phthalate, dioctyl phthalate, ethyl phthalyl ethyl glycollate, and particularly methoxyethyl acetyl ricinoleate. Other comparable materials, including the newer resinous type plasticizers, may be employed as desired.

Further to improve the flameproofing characteristics of the composition, as imparted by the vinyl resin, I employ finely divided antimony oxide. While other inorganic salts and oxides could be used in place of the antimony oxide, they either lack permanence or attack the fabric which they are intended to protect.

The principal elements of the composition are prepared as water dispersions with the aid of suitable emulsifying and dispersing agents. In the case of the vinyl resins, they are now commercially available in the form of water dispersions. The plasticizing agents are emulsified by using a small quantity, around 3%, of an oil-inwater type emulsifying agent. Dihexyl sodium sulfosuccinate, the sodium salt of alkyl phenoxyethyl sulfonate and the polyalkylene ether alcohols are examples of emulsifying agents which I have employed.

The antimony oxide is best dispersed by means of a ball or colloid mill with the aid of a dispersing agent such as polyvinyl alcohol, the sodium salt of alkyl naphthalene sulfonic acid, and the like. A small amount of a casein solution and/or sodium carboxymethyl cellulose are combined with the antimony oxide prior to dispersion thereof to stabilize the ultimate dispersion. In this connection, it should be pointed out that sodium carboxymethyl cellulose is added to the antimony oxide when polyvinyl chloride resin forms the base of the coating composition. When polymerized vinylidene chloride is used, hydroxyethyl cellulose replaces the sodium carboxymethyl cellulose. It should also be noted that the presence of casein in the composition requires the addition thereto of a fungicide, such as salicylanilid in ammonia, a chlorinated phenol, or the like, to preclude putrefaction. These fungicides will also serve as mildewproofing agents, extending the scope of protection afforded the treated fabrics. The casein solution may be omitted from the composition, if desired, for the cellulosic medium has been found to impart alone sufficient stability to the ultimate dispersion.

The water dispersions are combined and the pH of the composition is adjusted to maintain maximum stability. I have found that a pH of from 8.0 to 9.0 is most desirable. Ammonia is employed as the basic agent where the pH is too low and a weak acid, acetic acid, can be used to reduce an excessively high pH. Of course it will be realized that in the treatment of certain textiles and fibrous materials, the application is facilitated by considerable variance in the pH of the composition. It has been possible to reduce the pH of the mixture to as low as 3 and maintain a relatively stable dispersion. This should, however, be considered as an exceptional case. Compositions based upon vinylidene chloride can stand a wide range of variation in pH without coagulation, whereas mixtures employing polyvinyl chloride are quite readily coagulated if the pH thereof is reduced much below 7. These characteristics must be considered in conjunction with the selection of compositions for special applications.

Application of the composition to fibrous materials may be accomplished by roll coating, spraying, brushing or other standard method known to the art depending upon the viscosity of the composition, which in turn is controlled by the amount of add-on desired. By add-on is meant the weight of solids deposited in and around the fibers of the material as the result of the treatment. The nature of finish to be obtained will also affect the choice of method of application. Roll coating or brushing generally results in the formation of continuous impervious films upon the base material. Spraying or dipping followed by squeezing will provide a noncontinuous film wherein the fibers are fully protected but retain substantially their original appearance.

The treated materials are dried at an elevated temperature, 200 to 240° F., sufficient to evaporate the water vehicle. Higher temperatures, around 400° F. may be employed for short periods without deleterious effects.

The following examples of compositions embodying my invention are illustrative of compositions applicable for treating fibrous materials:

*Example 1*

| | Percent by weight |
|---|---|
| Water dispersion polyvinyl chloride (54% solids) | 38 –45 |
| Methoxyethyl acetyl ricinoleate emulsion (65%) | 20 –25 |
| Antimony oxide dispersion (70% solids) | 24 –32 |
| Sodium carboxymethyl cellulose (2% solution) | 3 – 5 |
| Caustic casein solution (10% solution) | 1 – 1.5 |
| Ammonium hydroxide (28%) | 0.5– 1.0 |

*Example 2*

| | Percent by weight |
|---|---|
| Water dispersion polyvinyl chloride (54% solids) | 42.07 |
| Methoxyethyl acetyl ricinoleate emulsion (65%) | 23.20 |
| Antimony oxide dispersion (70% solids) | 28.5 |
| Sodium carboxymethyl cellulose (2% solution) | 4.0 |
| Caustic casein solution (10% solution) | 1.34 |
| Ammonium hydroxide (28%) | .89 |

The pH of this composition is adjusted to be between 8 and 9. When being prepared for use the viscosity of the solution may be reduced by simple dilution with water.

The proportions of the several ingredients entering the composition may be varied with respect to each other even beyond the range given in Example 1 above. A particularly effective composition is the following:

*Example 3*

| | Percent by weight |
|---|---|
| Water dispersion of polyvinyl chloride (55% solids) | 14.0 |
| Dioctyl phthalate emulsion (65%) | 6.5 |
| Antimony oxide dispersion (70% solids) | 75.5 |
| Sodium carboxymethyl cellulose (2% solution) | 3.0 |
| Ammonium hydroxide (28%) | 1.0 |

This composition contains approximately 65% of solids and is diluted by simple addition of water to the solid content necessary to give the desired add-on.

As previously noted, when polymerized vinylidene chloride is employed in formulating the treating composition, it has been found necessary to replace the sodium carboxymethyl cellulose solution with hydroxyethyl cellulose. The vinylidene chloride content can be varied from 36 to 64 percent and there is a corresponding variation in the plasticizer content from 14 to 25 percent. I have found it possible to obtain adequate flameproofing with a composition having a vinylidene chloride base, when the antimony oxide content thereof is maintained between 14 and 32 percent of the mixture. A preferred formulation is:

*Example 4*

| | Percent by weight |
|---|---|
| Water dispersion of vinylidene chloride (56% solids) | 44.0 |
| Methoxyethyl acetyl ricinoleate emulsion (65%) | 24.0 |
| Antimony oxide dispersion (70% solids) | 31.0 |
| Hydroxyethyl cellulose (2% solution) | 1.0 |

As prepared the pH of this composition is approximately 7.0. Ammonium hydroxide may be added to raise the pH to 12 or the pH can be reduced to as low as 2.0 by the incorporation of hydrochloric acid if desired for special applications.

A heavier coating composition particularly adapted to yield a tough, continuous film when applied to fabrics has the formula:

Example 5

| | Percent by weight |
|---|---|
| Water dispersion vinylidene chloride (56% solids) | 64.0 |
| Methoxyethyl acetyl ricinoleate emulsion (65%) | 18.8 |
| Antimony oxide dispersion (70% solids) | 16.4 |
| Hydroxyethyl cellulose (2% solution) | 0.8 |

The plasticizer content of this mixture may be replaced in part by an emulsion of dibutyl phthalate or ethyl phthallyl ethyl glycollate.

It has been found possible to substitute a highly chlorinated paraffin for a portion of the vinylidene chloride where it is desired to augment the waterproofing characteristics of the composition. The presence of chlorinated paraffin in the composition also reduces the "after-glow" in fabrics treated therewith. In this preparation, the chlorinated paraffin and antimony oxide are dispersed in water together and thereafter combined with the water dispersed vinylidene chloride and plasticizer. A suitable formulation follows:

Example 6

| | Percent by weight |
|---|---|
| Chlorinated paraffin (70% chlorine) | 24.48 |
| Antimony oxide (solid basis) | 17.68 |
| Methoxyethyl acetyl ricinoleate emulsion (65%) | 16.00 |
| Water dispersed vinylidene chloride (56% solids) | 16.00 |

The chlorinated paraffin and antimony oxide content represented above is obtained by taking 68% of a water dispersion of 36% of chlorinated paraffin, 26% of antimony oxide, 2% of polyvinyl alcohol and 36% of water.

The compositions herein described may be applied to paper, cotton, rayon, wool and silks and result in a water- and flameproofing thereof which will withstand dry-cleaning and ordinary laundering. Of particular interest is the treatment of both raw cotton linters and cotton thread which is possible with my novel compositions. Raw cotton, after ginning, is treated by spraying or dipping and pressing with a formulation as expressed in Example 3. The cotton linters can thereafter be carded or combed and spun into thread in conventional apparatus, for the added materials after drying, do not affect deleteriously the original surface characteristics of the cotton. In a similar manner, I have imparted water- and flameproofing properties to cotton thread prior to weaving it into cloth. The treated thread was handled on regular looms without difficulty and the woven product was water- and flameproof.

The compositions herein described may be modified further by the inclusion therewith of water dispersible pigments or dyes. In this manner coloring of the material being treated is accomplished concurrently with the water- and flameproofing.

Suitable modifications and changes may be made in the invention without departing from the spirit and scope thereof, the foregoing description being intended by way of illustration, except as defined in the appended claim.

What I claim is:

A water- and flameproofing composition consisting of 14 per cent by weight of a water dispersion of polyvinyl chloride containing 55 per cent of polyvinyl chloride, 6.5 per cent by weight of a plasticizing agent for the polyvinyl chloride selected from the group consisting of dibutyl phthalate, dioctyl phthalate, ethyl phthalyl ethyl glycollate, and methoxyethyl acetyl ricinoleate, said plasticizing agent being in the form of an aqueous emulsion containing 65% of the agent, 75.5 per cent by weight of a water dispersion of antimony oxide containing 70 per cent of antimony oxide, 3 per cent by weight of a 2% solution of sodium carboxymethyl cellulose and 1 per cent by weight of a 28% solution of ammonium hydroxide.

JAMES FRANCIS McCARTHY.

REFERENCES CITED

The following references are of record in the file of this patent:

UNITED STATES PATENTS

| Number | Name | Date |
|---|---|---|
| 2,245,708 | Patton | June 17, 1941 |
| 2,249,916 | Reinhardt et al. | July 22, 1941 |
| 2,413,163 | Bacon | Dec. 24, 1946 |
| 2,416,447 | Laughlin et al. | Feb. 25, 1947 |
| 2,428,716 | McGill et al. | Oct. 7, 1947 |
| 2,436,216 | Leatherman | Feb. 17, 1948 |

OTHER REFERENCES

Hollabaugh et al.: Industrial & Eng. Chem., vol. 37, No. 10 (October 1945), pp. 943–47.